United States Patent
Woodall et al.

(10) Patent No.: US 9,524,008 B1
(45) Date of Patent: Dec. 20, 2016

(54) VARIABLE FRAME RATE TIMING CONTROLLER FOR DISPLAY DEVICES

(75) Inventors: Neil D. Woodall, Newport Beach, CA (US); James Zhou, San Jose, CA (US); Bob Zhang, Santa Clara, CA (US); Richard Miller, Cupertino, CA (US)

(73) Assignee: PIXELWORKS, INC., Portland, OR (US)

( * ) Notice: Subject to any disclaimer, the term of this patent is extended or adjusted under 35 U.S.C. 154(b) by 198 days.

(21) Appl. No.: 13/610,382

(22) Filed: Sep. 11, 2012

(51) Int. Cl.
- *G09G 5/18* (2006.01)
- *G06F 1/32* (2006.01)
- *G06F 17/30* (2006.01)
- *G06T 3/40* (2006.01)

(52) U.S. Cl.
CPC ........... *G06F 1/3203* (2013.01); *G06F 1/3265* (2013.01); *G06F 17/30825* (2013.01); *G06T 3/4069* (2013.01); *G09G 2310/0229* (2013.01); *G09G 2310/061* (2013.01); *G09G 2320/06* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 5,604,509 A * | 2/1997 | Moore et al. | 345/2.1 |
| 5,610,661 A * | 3/1997 | Bhatt | 348/446 |
| 7,084,923 B2 * | 8/2006 | Brown Elliott et al. | 348/441 |
| 8,520,734 B1 * | 8/2013 | Xu | 375/240.16 |
| 2003/0103567 A1 * | 6/2003 | Riemens et al. | 375/240.16 |
| 2007/0150893 A1 * | 6/2007 | Grobman | G06F 1/3203 718/1 |
| 2009/0184960 A1 * | 7/2009 | Carr et al. | 345/422 |
| 2009/0213033 A1 * | 8/2009 | Chen | G09G 3/3611 345/1.1 |
| 2009/0322720 A1 * | 12/2009 | Inoue | 345/208 |
| 2010/0039557 A1 * | 2/2010 | Mori et al. | 348/459 |
| 2010/0123727 A1 * | 5/2010 | Kwa et al. | 345/522 |
| 2010/0128792 A1 * | 5/2010 | Saito et al. | 375/240.16 |
| 2010/0315550 A1 * | 12/2010 | Yokoyama | 348/452 |
| 2011/0025910 A1 * | 2/2011 | Furukawa et al. | 348/441 |
| 2011/0211128 A1 * | 9/2011 | Petrides | 348/699 |

* cited by examiner

*Primary Examiner* — Mark Zimmerman
*Assistant Examiner* — Yu-Jang Tswei
(74) *Attorney, Agent, or Firm* — Marger Johnson

(57) ABSTRACT

An apparatus includes a display device having a pixel and vector storage, and a by-pass mode and an interpolation mode, wherein the interpolation mode converts input data from an input frame rate to a display refresh rate based on pixel and vector data stored in the storage. A method includes determining a selected interpolation mode to be employed by a frame interpolator, retrieving pixel data and vector data received from a host system from a storage, and generating interpolated frames of display data according to the selected interpolation mode.

14 Claims, 9 Drawing Sheets

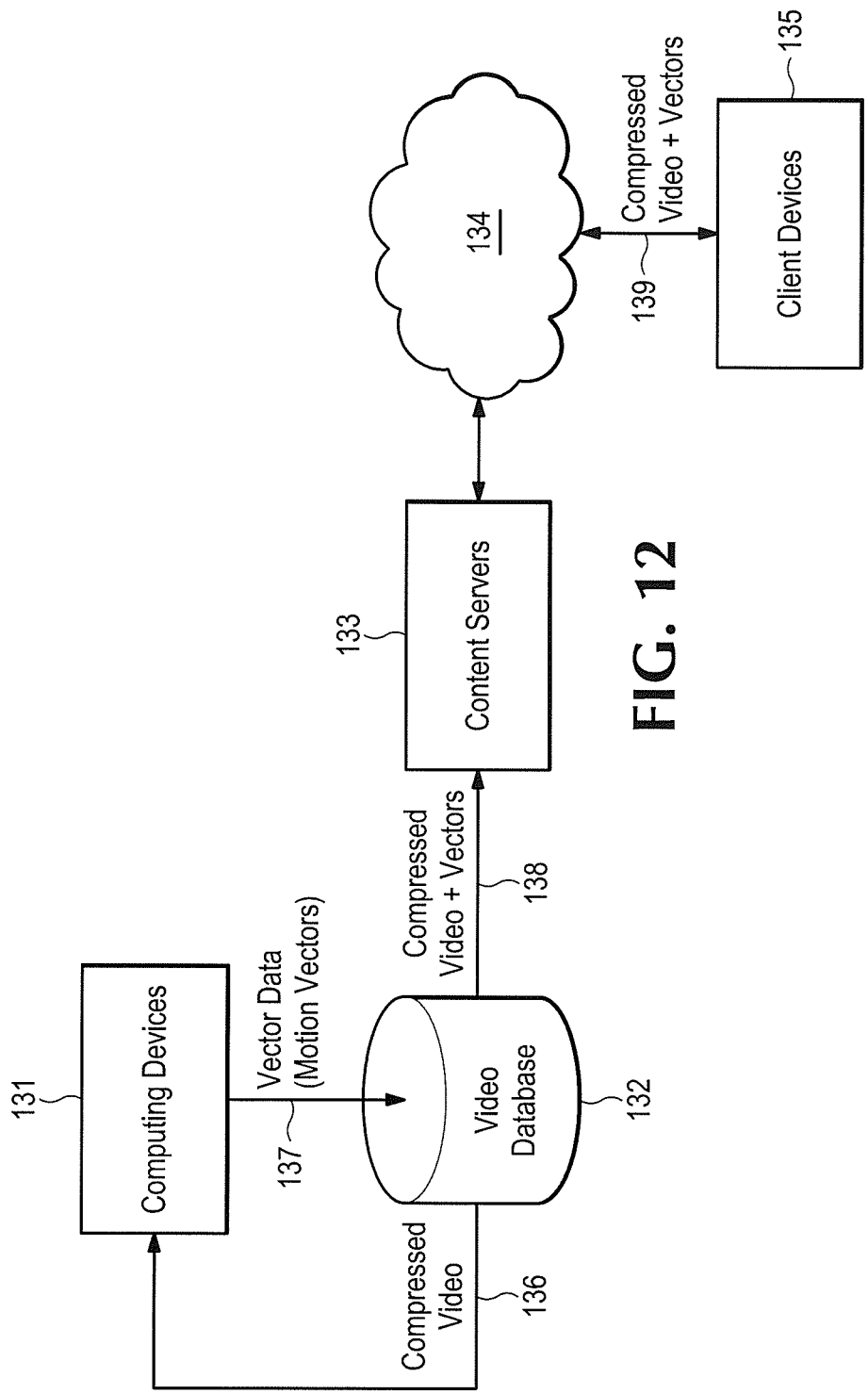

VARIABLE FRAME RATE TIMING CONTROLLER FOR DISPLAY DEVICES

BACKGROUND

In display systems, the panel is driven by drivers (column drivers and row drivers), which are controlled by display controllers. The primary function of the display controllers (TCON) is for timing control. A TCON might also integrate drivers to directly drive a panel. On the input side, the display controller is interfacing with host systems such as a graphic processing unit (GPU), an application processor with GPU integrated, or other type of processors like TV SoCs. In some situations, the display controllers are also integrated in SoCs. Commonly used interfaces between host systems and display devices are LVDS, DisplayPort, MIPI, V-by-one.

The display devices are generally programmed to work at a fixed timing such as 60 Hz or 120 Hz, which is the refresh rate measured as the number of frames per second (fps). The display is drawing the frame at this fixed refresh rate regardless of whether the frame is static or not. A self-refresh mode is a special TCON work mode where the display devices keeps drawing a previously captured frame in the TCON independently from the host system so that the GPU and other display related blocks in the host systems can be shut off for power saving. The self-fresh mode requires a frame buffer inside the TCON.

The self-fresh mode only addresses the case where the frame is completely static. When there is a slight change, even just a small motion for one pixel, the self-refresh mode needs to be switched off and the TCON needs to switch back to default work mode to take 60 fps data from the host system. In this case, the host system needs to read pixel data from the frame buffer at a fixed 60 frames per second even GPU or HD Video codec might be writing to the buffers at a much lower frame rate, or in some other situations writing the same repeating pixels between frames when there is a small change between frames. Related technology is the US Patent Publication US2010/0123727 A1 published on May 20, 2010 filed Nov. 18, 2008. This patent describes an invention that a module monitors the graphics activity and then configures the display device to operate at self-refresh mode.

The strong temporal correlation between successive frames can be exploited to re-define the data as key frames plus vector data with low motion frames being skipped. The vector data (motion vectors for video cases) can be calculated by CPU or GPU, calculated off-line in the cloud by servers, or beforehand in a personal computer. With the new vector data, the host system can operate at desired frame rate, for example 24 fps for film or even lower frame rate such as 15 fps for low motion animation drawing. The display device (TCON) will receive fewer frames with additional vector data that is frame, block or pixel based. The TCON will use the 2-dimensional (2D, horizontal plus vertical) vector data plus the pixel data to generate the interpolated frames (the skipped frames). These 2D motion vectors are not the same as the motion vectors used in digital video codecs. Those motion vectors are optimized for coding efficiency and in general are not equal to motion vectors that describe the true motion in the image.

Frame based vectors describe a model that can be used to determine block or pixel based motion vectors. The block or pixel based motion vectors can be determined using the app processor CPU/GPU or in the TCON itself. An example of a using key frames and a frame based model for motion vectors is when implementing a special effect for a user interface, such as rotating the screen image to match a tablet's orientation. During the special effect, the "motion" is already known and the GPU is using the frame based model to do the warping. For smaller amounts of warping, the frame interpolation algorithm in the TCON is capable of providing a similar effect, but at a potentially higher frame rate and without impacting the bandwidth of the application processor, resulting in a more responsive system.

When all vectors are force to zero, most blocks in host system can be shut off for power saving and the TCON falls back to the self-refresh mode. When vectors are not zeros, the host systems can operate at lower frequency, rendering the pixels at lower frame rate, which also saves power for active state. When contents' native frame rate is lower than 60 fps, the frame interpolator in TCON helps improve the picture quality by creating smooth motion and reducing motion judder.

BRIEF DESCRIPTION OF THE DRAWINGS

FIG. 12 shows an embodiment of a method to generate motion vector data on a server side.

DETAILED DESCRIPTION OF THE EMBODIMENTS

Figure 1:
FIG. 1 shows an embodiment of a display pipeline.

FIG. 1 shows embodiments of a display pipeline and the separation between the host systems and display devices (TCON) are separated. The panel 301 is the actual panel of elements such as a liquid crystal device (LCD) panel.

Figure 2:
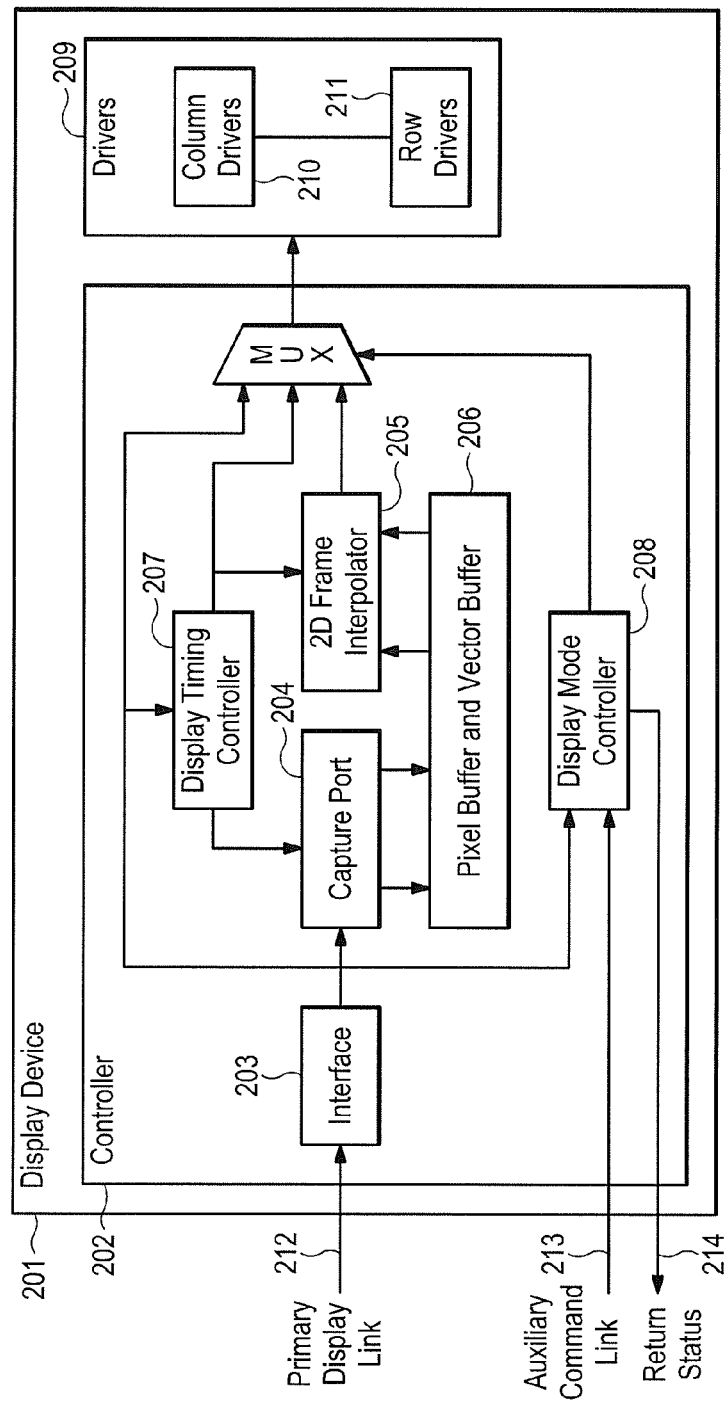
FIG. 2 shows an embodiment of a display device.

FIG. 2 shows a block diagram of an embodiment of a display device. The display device 201 has embedded memory 206 typically using frame buffers used as pixel storage and data buffers used as vector data storage. The capture port 204 receives the data from interface receiver 203, and un-packs and separates the vectors from pixel data. Capture port 204 writes separated data to the buffer 206. The display timing controller 207 drives the drivers 209 at a fixed timing such as 60 Hz, as an example, but the capture port 204 operates at lower timing depending on the effective frame rate. The display timing controller 207 not only programs the drivers to drive the panel, but it also synchronizes the 2D frame interpolation read logic.

The display mode controller 208 controls whether display device is functioning in interpolator mode or by-pass mode. In by-pass mode, the capture port, memory and 2D frame interpolator 205 can be shut off for power saving and the display device is directly controlled by host systems at the display refresh rate. In interpolator mode, the 2D frame interpolator reads pixel data and vector data to generate interpolated frames. During this duration, the host system has an option to either lowering its frequency or temporarily shut off its subsystems since the display device does not need the data to refresh the display for this frame duration. When the image becomes completely static, that is where all vectors are 0 vectors, the display device operates as self-refresh mode. The pixel data and vector data come from primary display link 212 from the host system. The auxiliary command link 213 carries the commands from the host system. Based on GPU activity or the distinguishable frames per second, the host system can configure the display device to work at different work mode. The return status channel 214 returns the display device status to notify the host system such that the host system can become re-active or remain in power saving stand-by mode.

Figure 3:
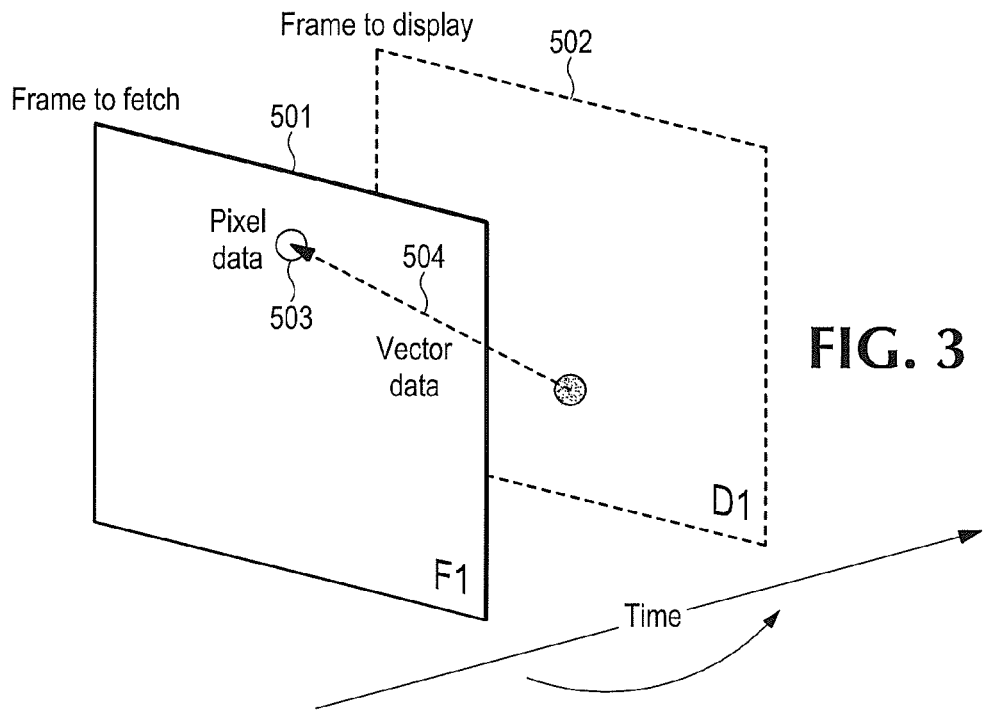
FIGS. 3-7 show embodiments of interpolation modes for a two-dimensional frame interpolator.

FIG. 3 demonstrates one of the interpolation modes for the 2D frame interpolator 205. In this interpolation mode, the interpolator only uses one-frame pixel data such as pixel 503 from frame 501 plus vector data 504 to generate the "missing" frames such as frame 502. The one-frame interpolation mode has advantages in reducing frame latency. Essentially this mode has comparable latency as configurations of a TCON without having a frame interpolator. As 2D vectors only describe the motion for one frame, this mode will not be able to re-construct the occluded regions in the interpolated frames.

Figure 4:
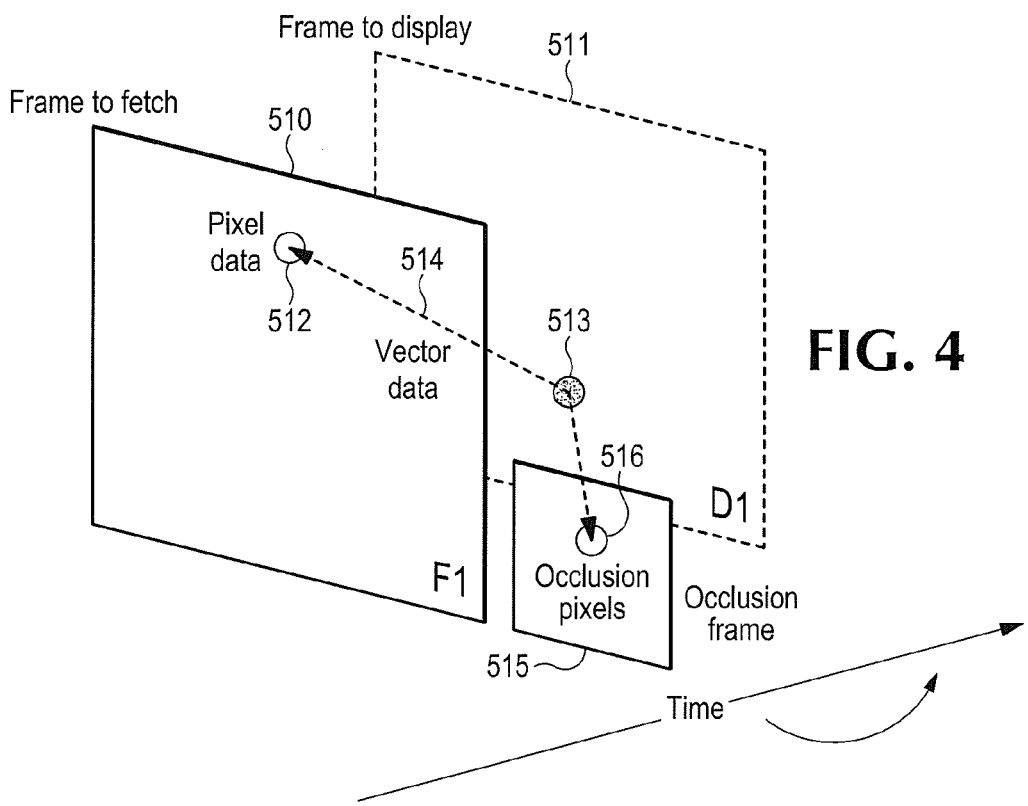

FIG. 4 demonstrates another of the interpolation modes for 2D frame interpolator 205. In this interpolation mode, the interpolator only uses one-frame pixel data such as 512 and occlusion data such as occlusion pixel 516 plus the vector data 514 to generate the "missing" frames such pixel 513 in frame 511. This interpolation mode will have better picture quality compared with the interpolation without the occlusion data above. The interpolation modes described in FIG. 3 and FIG. 4 are suitable for low latency cases, such as gaming.

Figure 5:
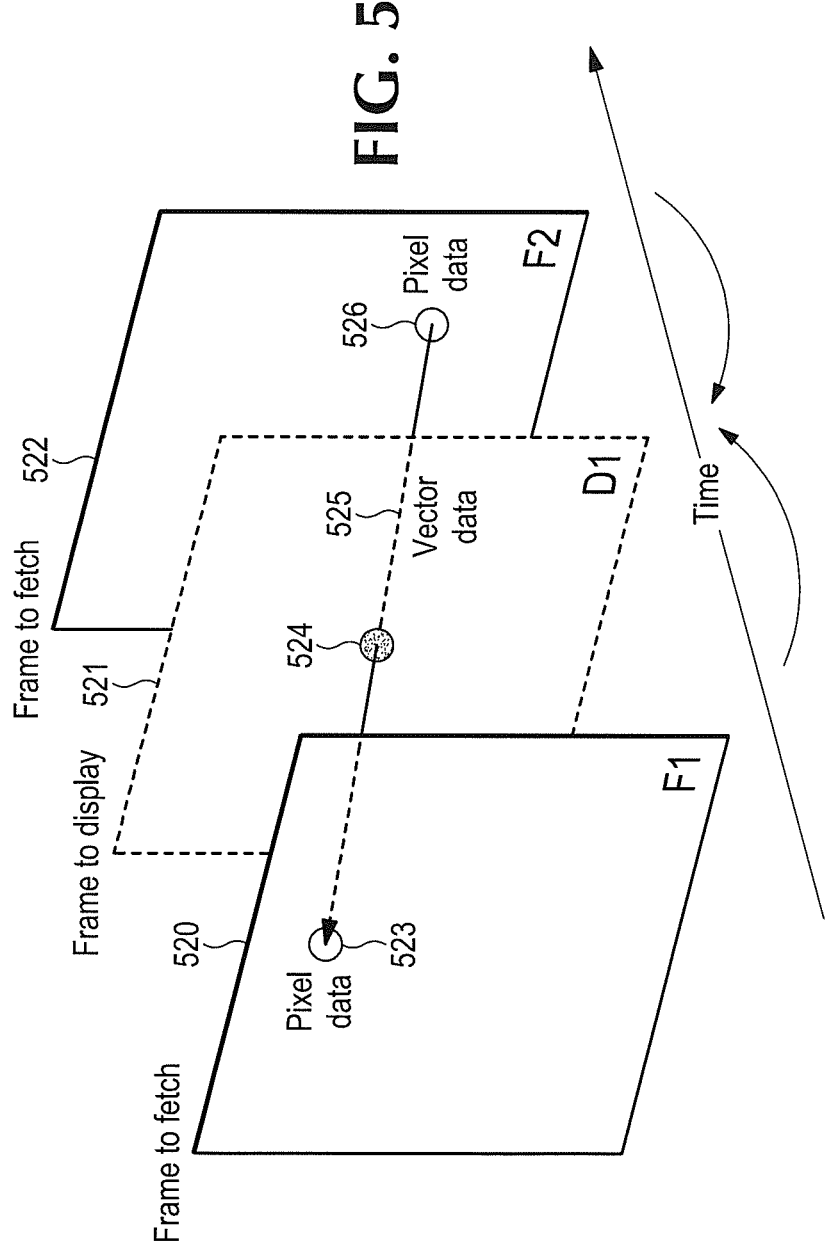

FIG. 5 shows another of the interpolation modes for the 2D frame interpolator 205. In this interpolation mode, the interpolator uses two-frame pixel data such as pixels 523 and 526 from frames 520 and 522 plus vector data 524 to generate the interpolated pixels in the frames such as 521 between the two frames. The use of the two frames allows the interpolation algorithm to choose advanced blending logic based on vectors from two frames such as vector 525. The picture quality in general is better than one-frame interpolation algorithm but will increase the frame latency to the pipeline with a minimum of 1.5 frame delay at the input rate. This mode is suitable for video, film and transition special effect uses where the native frame rate in general is much lower than display refresh rate, and latency is less of a factor of concern.

Figure 6:
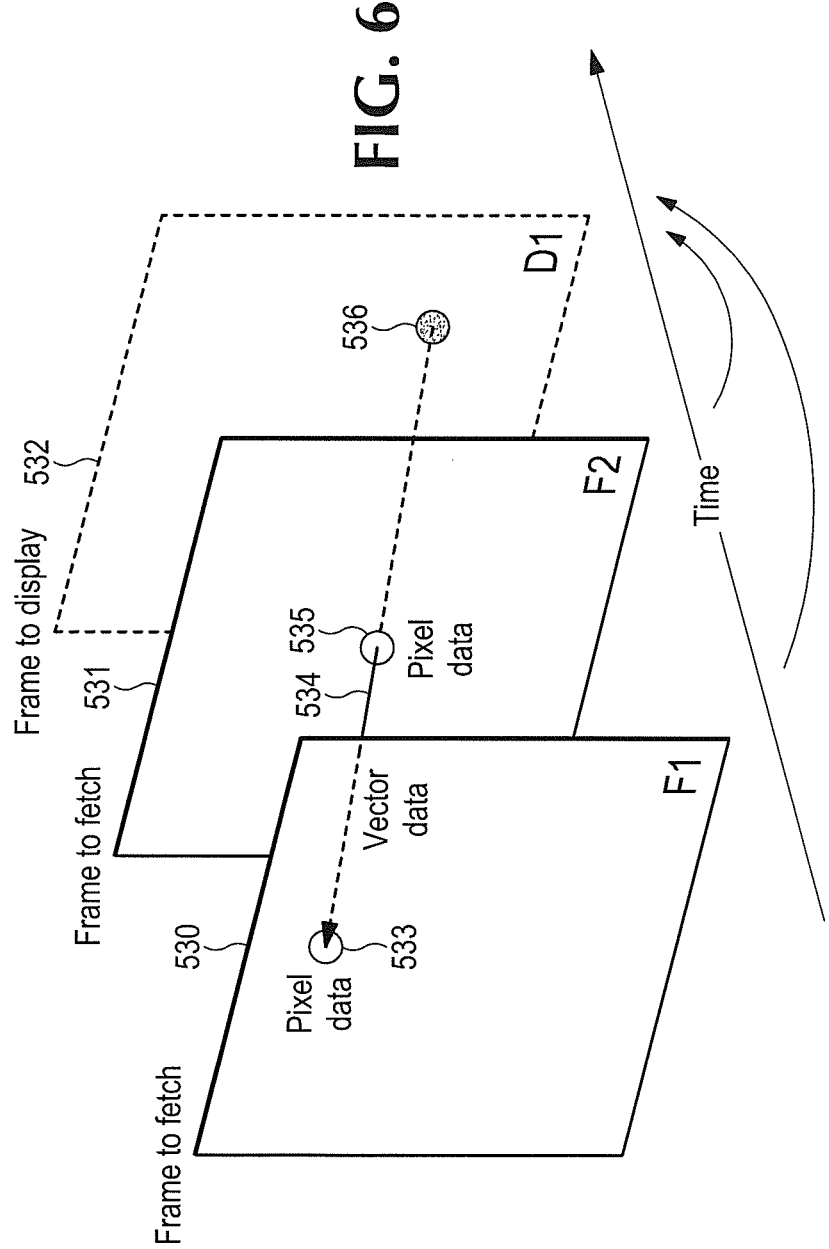

FIG. 6 shows another of the interpolation modes for the 2D frame interpolator 205. In this interpolation mode, the interpolator only uses two-frame pixel data such as pixels 533 from frame 530 and 535 from frame 531 plus vector data 534 to generate the interpolated frames such as pixel 536 in frame 532 after the two frames. The interpolation is essentially an extrapolation where the interpolated frames are generated based on two-previous-frame plus vector. The picture quality in general might slightly worse than inter-interpolation but this mode does not add high latency as the one described in FIG. 5.

Figure 7:
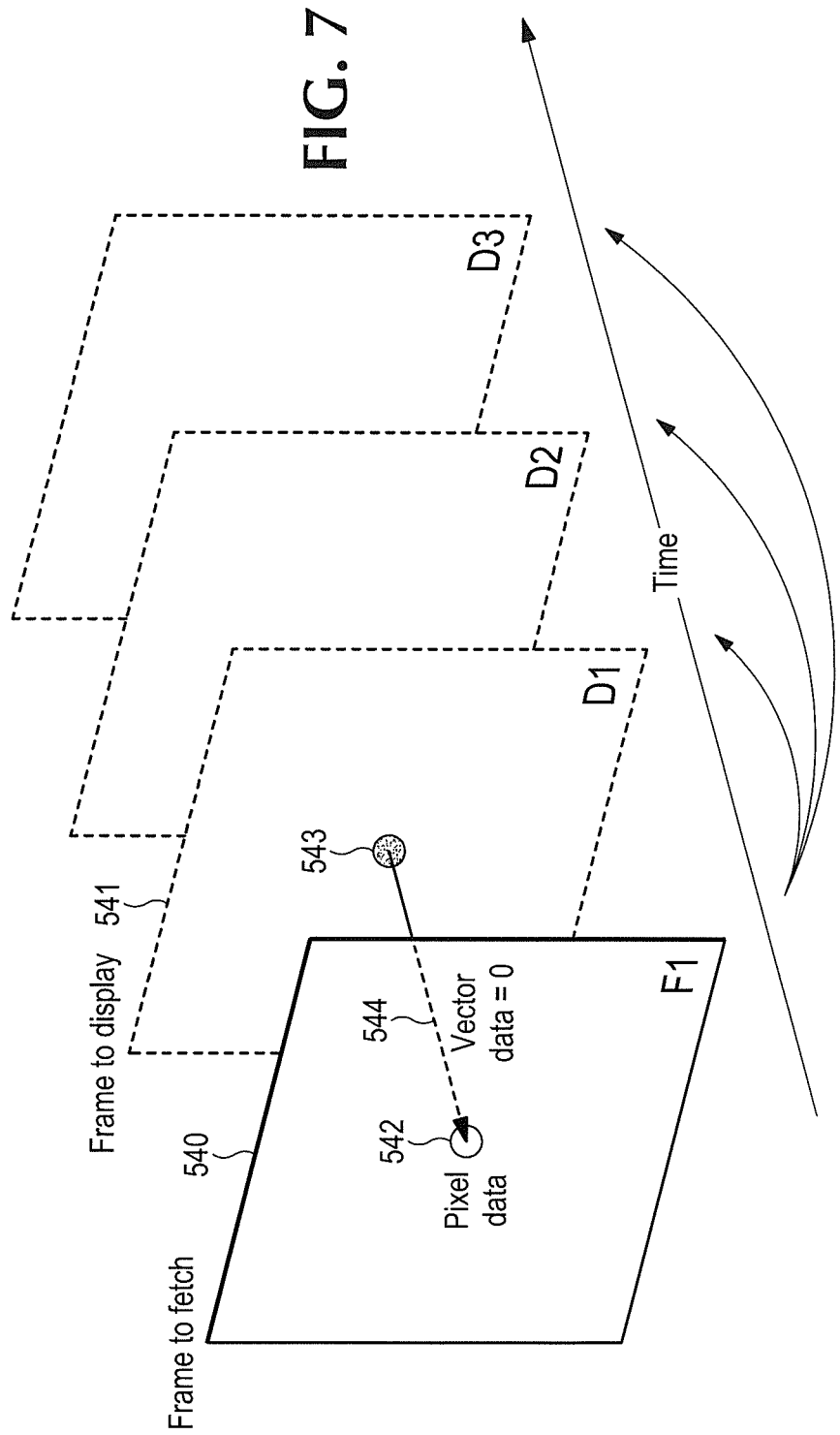

FIG. 7 shows another of the interpolation modes for 2D frame interpolator 205. In this interpolation mode, the interpolator only uses one-frame pixel data such as pixel 542 from frame 540 and all the vectors are equal to zero. No interpolation or blending is needed as the interpolator just needs to repeat the same frames such as pixels 543 in frame 541 one after another. This is also known as self-refresh mode.

Figure 8:
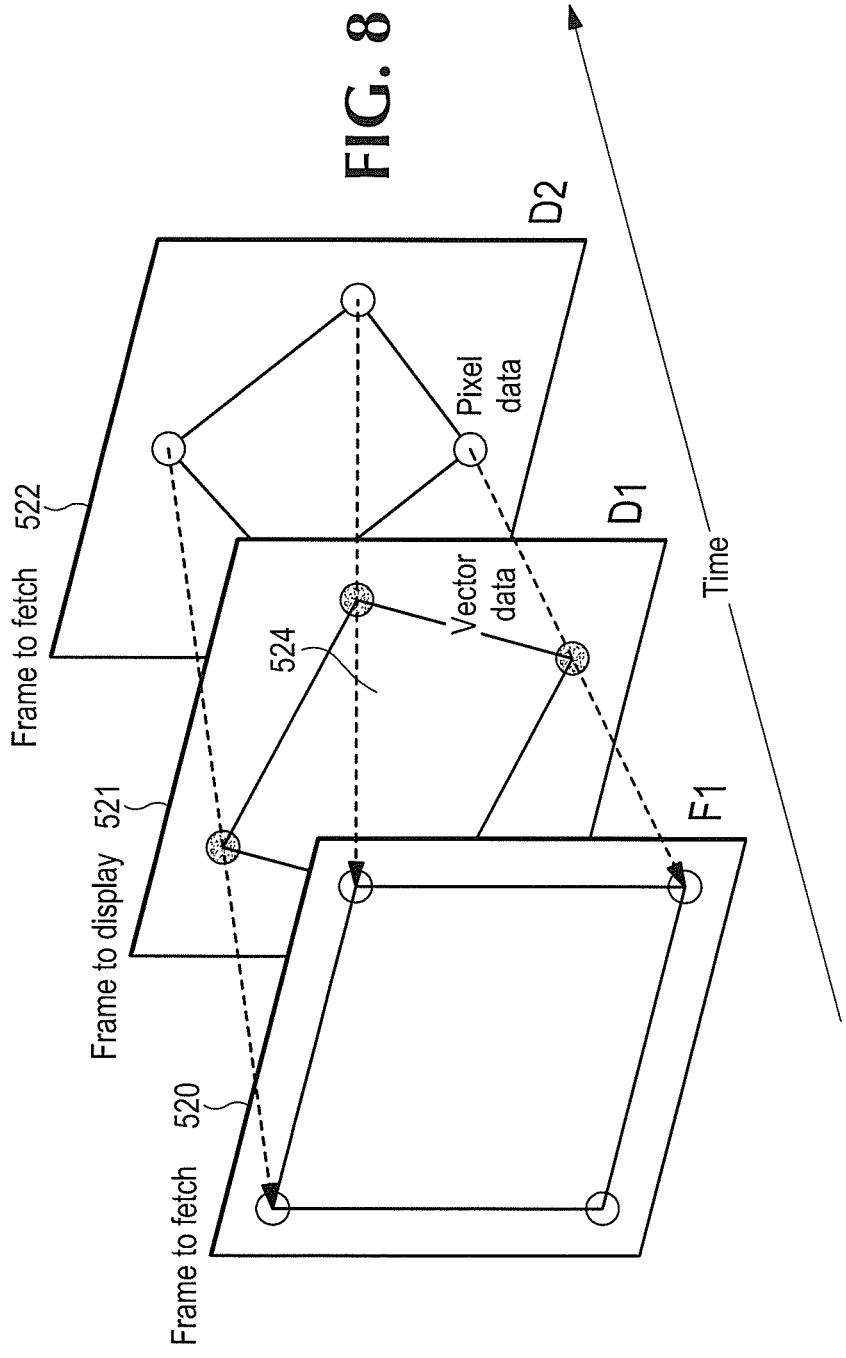
FIG. 8 shows an embodiment of an interpolation mode for special effects.

FIG. 8 shows the interpolation mode for doing special effects. F1 and F2, shown in FIG. 5, are the two key frames and the motion model is a rotation plus scaling:

$$MVx=k1*y+k2x+k3$$

$$MVy=k4*x+k5*y+k6$$

In this interpolation mode, the motion vectors are not calculated by comparing F1 and F2, but instead are calculated by using the same model that was used to generate F2 from F1. The block or pixel motion vectors can be calculated in either the application processor SOC or in the TCON. Furthermore, because there is no occlusion in the transformation, the contents of D1 can be interpolated from either F1 or F2, or both. If D1 only uses data from F1 when calculating D1, when D1 is closer in time to F1, the amount of latency can be reduced. If the special effect causes some of the content to be located off the display, which is another form of occlusion, then it might be necessary to use both F1 and F2 to calculate D1.

Figure 9:
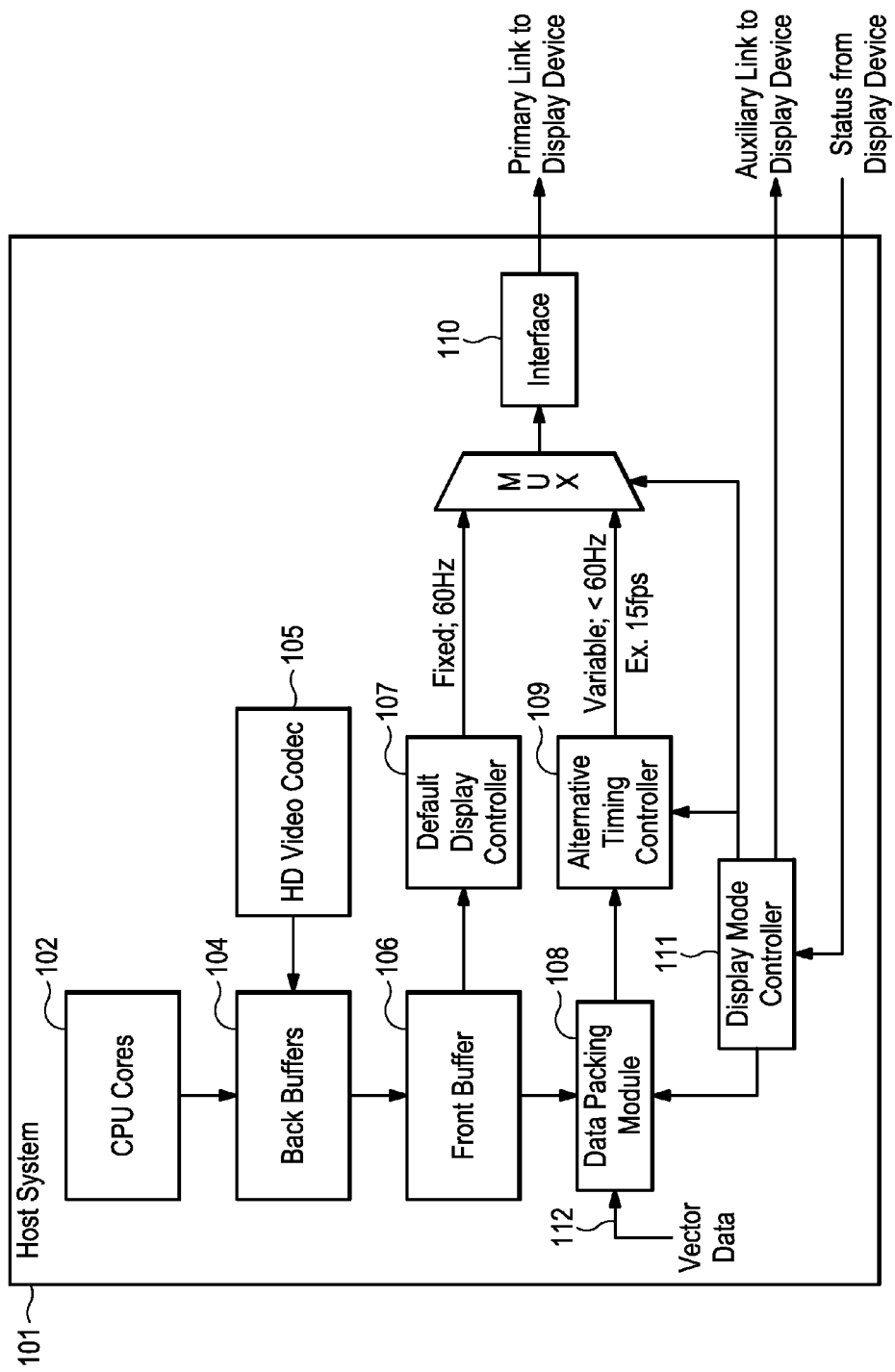
FIG. 9 shows an embodiment of a host system.

FIG. 9 is a block diagram of an embodiment of the host system that works with the embodiments discussed here. The embodiments use the vector data provided by the host system 101, and rely upon certain communication between the host system and display device. Pixels in the front buffer 106 may be generated by HD video codec 105 or rendered by GPU 102. The embodiments may use a supplemental or alternative display timing controller 109 to retrieve pixels at lower than 60 Hz based on the actual frame rate in the contents. The data packing module 108 packs the vector data with pixel data coming from front buffer, and this is sent to the interface transmitter 110. The display mode controller 111 communicates with display device to determine the pixel display data path and work mode in the host system.

Figure 10:
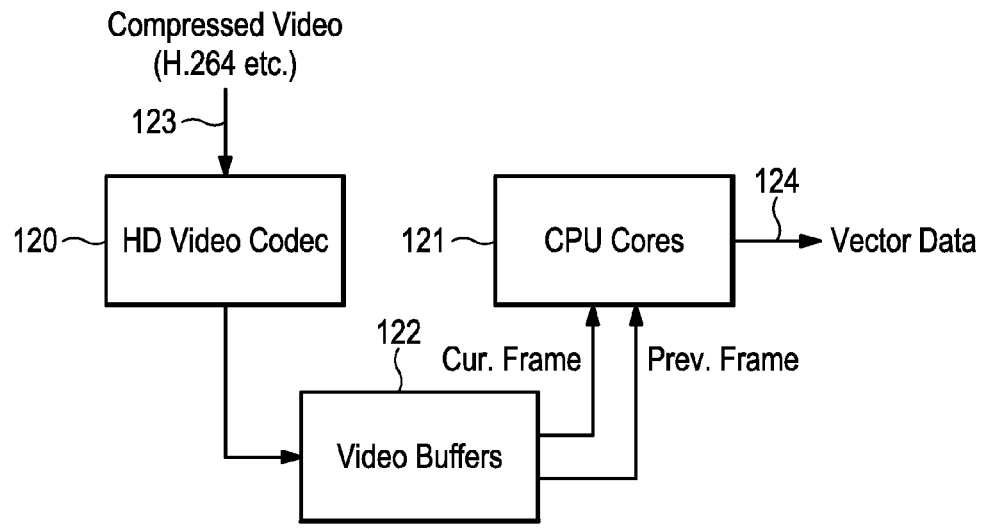
FIGS. 10-11 show embodiments of a method for generating motion vector data in real time.

FIG. 10 shows an embodiment of a method to generate the vector data in real time. Software running on CPU 121 retrieves the pixel data stored in the video buffers 122 from the HD video codec 120 and calculates the vector, such as motion for video, vector for graphics, between current frame and previous frame and generates the vector data.

Figure 11:
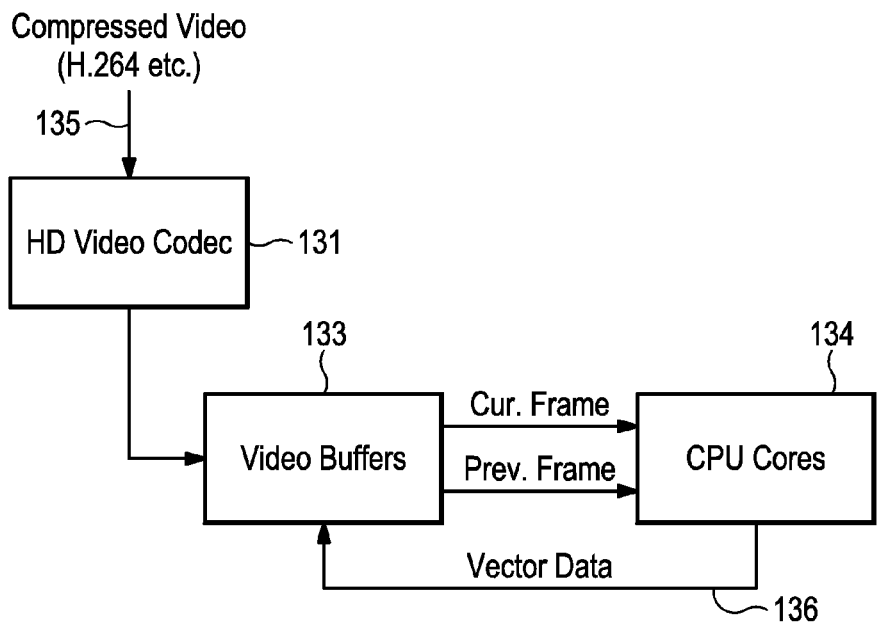

FIG. 11 shows another embodiment of a method to generate the vector data in real time. Software running on CPU 132 and GPU 134 retrieves the pixel data from the video buffers 133 stored there by the HD video codec 131 and calculates the vector, motion for video and vector for graphics, between the current frame and previous frame and generates the vector data. The GPU portion may direct operate pixels in its own frame buffer instead of transferring the pixels from video memory to system memory.

FIG. 12 shows an embodiment to generate the vector data on a server side. Pre-rendered contents or pre-encoded video contents are being processed by computing device 131 to get the vector data, and this vector data is inserted to the contents in the video database 132 and delivered to the client devices 135 from the content server 133 as compressed video plus vectors. In this method, the client devices do not need to use their own CPU or GPU to calculate vector data as the vectors are already being provided.

A key difference between the self-refresh TCON of US Patent Publication 2010/0123727 mentioned and frame interpolator TCON is that self-refresh is essentially and on-off device where power saving is achieved only on the static image. The frame interpolator TCON extends the power saving for active mode and in the same time improves the picture quality with smoother motion when the content's native frame rate is lower than display refresh rate.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An apparatus, comprising:
    a display device, the display device comprising:
        a pixel field or frame storage;
        motion vector data storage; and
        a two-dimensional frame interpolator;
    wherein the display device has a by-pass mode and an interpolation mode wherein the interpolation mode:
        causes the interpolator to read pixel data and motion vector data from storage and generate interpolated pixels along the direction defined by motion vectors contained in the motion vector data, wherein the motion vectors are based upon motion of an object, at least one motion vector from storage was not used to decode the pixel data in storage, and at least one motion vector was sent in addition to data used by a coder/decoder;
        converts input data from an input frame rate to a display refresh rate based on pixel and motion vector data stored in the storage, and
        the host system does one of either lowering a host system frequency or shutting off the host system subsystems as the frame interpolator generates the interpolated frame data for the display device; and
    wherein the bypass mode:
        shuts down the pixel and motion vector storage and the interpolator.

2. The apparatus of claim 1, further comprising a display panel arranged to receive signals from the display device, the signals to drive the display panel.

3. The apparatus of claim 1, wherein the host system further comprises the host system coupled to the display device through a primary display interface and auxiliary command interface, the host system to provide the pixel and motion vector data to the display device, the motion vector data being based upon motion of the object.

4. An apparatus of claim 3, wherein the display device further comprises a display mode controller in communication with the host system, the display mode controller to configure the display devices to select either the interpolation mode or the by-pass mode.

5. An apparatus of claim 1, wherein the display device further comprises a capture port to capture and unpack the pixel and vector data and write the pixel and motion vector data to the storage with a capturing frame rate based upon an effective frame rate.

6. The apparatus of claim 1, wherein the at least one of the motion vectors sent was generated from the vector data used by a graphics processing unit.

7. An apparatus of claim 1, wherein the display device further comprises a display timing controller connected to the frame interpolator, the display timing controller configured to control the frame interpolator and generates display timing which is independent of an interface receiver timing.

8. A method, comprising:
    determining a selected interpolation mode to be employed by a frame interpolator;
    having a host system either reduce the frequency of the host system or shut off host system subsystems in the interpolation mode;
    retrieving video pixel data and motion vector data received from the host system from a storage; and
    generating interpolated frames of display data according to the selected interpolation mode using the video pixel data and motion vector data, wherein the motion vector data is based upon motion of an object, at least one motion vector from the storage was not used to decode the pixel data in storage and at least one motion vector was in addition to data used by a coder/decoder.

9. The method of claim 8, wherein the selected interpolation mode comprises:
    using one-frame of pixel data and vector data; and
    generating interpolated pixels based on the pixel data with translation motion based on motion vectors contained in the motion vector data.

10. The method of claim 8, wherein the selected interpolation mode comprises:
    using one-frame pixel data, occlusion-frame pixel data, and motion vector data; and
    generating interpolated pixel data based upon pixel data with translation motion based on motion vectors contained in the motion vector data for non-occluded regions and using the occlusion data for occluded regions.

11. The method of claim 8, wherein the selected interpolation mode comprises:
    using two-frame pixel data and motion vector data, the two frames being before and after the interpolated frame in time; and
    generating interpolated pixels based on blending pixels from the two frames along motion vectors contained in the motion vector data.

12. The method of claim 8, wherein the selected interpolation mode comprises:
    using two-frame pixel data from two previous frames and motion vector data; and
    generating interpolated pixels based upon extrapolation from the two previous frames and the motion vector data.

13. The method of claim 8, wherein the selected interpolation mode comprises:
    detecting no motion in a motion vector field; and
    entering a self-refresh mode.

14. The method of claim 8, wherein the selected interpolation mode comprises a special effects mode.

* * * * *